United States Patent Office 2,965,270
Patented Dec. 20, 1960

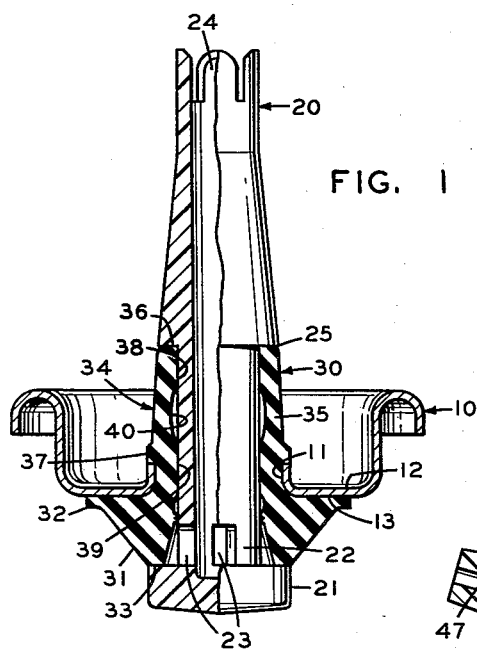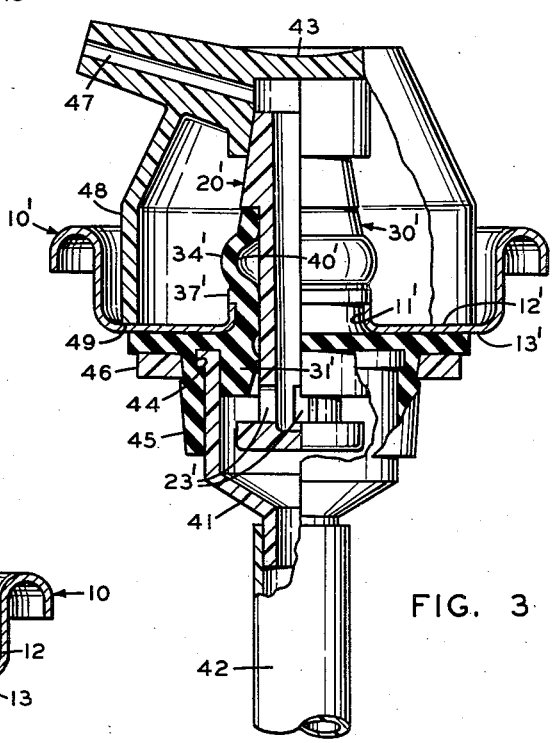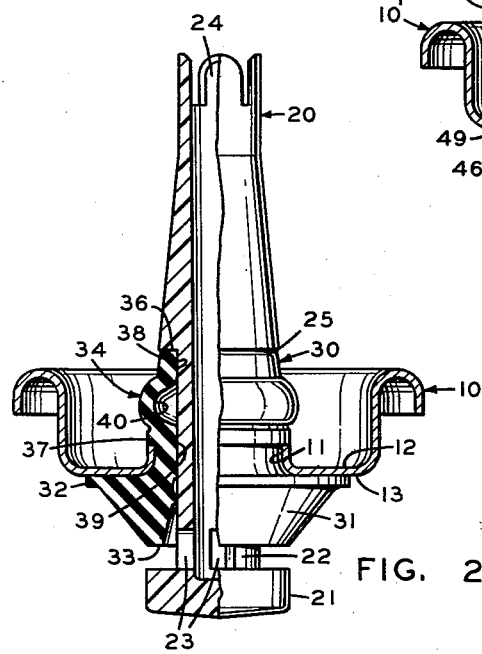

2,965,270

DISPENSING VALVE HAVING SPRING OF ELASTIC MATERIAL

Jack W. Soffer, St. Louis, and Eugene H. Neupert, Ferguson, Mo., assignors to Development Research, Inc., St. Louis, Mo., a corporation of Missouri Filed June 12, 1957, Ser. No. 665,267

1 Claim. (Cl. 222—394)

This invention relates to improvements in dispensing valves for pressure dispensers, and particularly in means for mounting, sealing and opening and closing such valves.

Prior to the present invention, such valves have utilized metal springs to permit opening and closing by tilting the valve stem with the dispenser inverted or by pushing down on the valve stem with the dispenser upright, or have utilized rubber-like materials to permit opening by tilting the valve stem. It is desirable to insert gas under pressure into dispensers through such valves with an automatic gassing machine which pushes down on the valve stem, compressing the metal spring or the rubber-like material. For this purpose, such valve stems must be downwardly displaceable sufficiently to permit fast gassing and close quickly without leakage.

A principal purpose of this invention is to provide a valve for pressure dispensers which opens adequately to permit quick gassing and closes surely and promptly without leakage. A further purpose of this invention is to provide such a valve suitable for dispensing by either tilting or pushing down on the valve stem. A further purpose of this invention is to provide such a valve with a combination valve mount, seal and spring which cannot be inadvertently pushed downward out of its position in the top wall of the container. Still further purposes will be apparent from this specification.

These purposes are accomplished by mounting a valving stem within a dispenser wall opening by means of a resilient tubular valve mount which also functions as a combined seal and spring. The spring portion of the valve mount is so positioned that its upper end bears against an external shoulder on the valve stem and an enlargement in the region of its lower end, projecting radially outward just above the dispenser wall opening, bears against the dispenser wall. The tubular wall of this spring portion has a tight bore whose upper and lower portions grasp the valving stem, but lubricated to permit the stem to slide within the lower portion. Intermediate these bore portions, the wall of the spring portion has an annular area which is weakened by enlarging its inner diameter. The lower portion of the valve mount is radially enlarged so as to form a compressible seal and valve-seating face.

When a downward force is applied to the valve stem, the tube wall of the spring portion bows elastically radially outward in the vicinity of its thinned area permitting the valve to unseat. Such outward bowing effectually locks the valve mount to the dispenser wall, so that it cannot be pushed downward through the wall opening. When the downward force is released, the tube wall returns to its normal position, re-seating the valve.

In the drawings:

Figure 1 is a side view, partly in section and partly in elevation, of a preferred embodiment of the present invention as employed in a tilt valve assembly, shown in closed position;

Figure 2 is a view similar to Figure 1, showing the same valve pushed downward in open position as during gassing; and Figure 3 is a side view, partly in section and partly in elevation, of a "push-down" valve embodying the present invention, shown in open position as for dispensing.

The valve assembly in Figure 1 comprises a mounting cup generally designated 10 adapted for mounting on a pressure dispenser, not shown, a substantially rigid tubular valving spout generally designated 20, and a tubular valve mount generally designated 30 molded of elastic rubber-like material.

The mounting cup 10 has a central flanged circular opening 11 within which the spout 20 is sealedly mounted by the valve mount 30; also an outer cup surface 12 and an inner cup surface 13.

The spout 20 includes a lower valving member 21, a cylindrical wall 22, a port 23 in said wall 22 above said valving member 21, an upper spout opening 24 and a downwardly-presented annular shoulder 25 projecting outwardly from said cylindrical wall 22 intermediate said spout opening 24 and said valving member 21.

The valve mount 30 encompasses the spout cylindrical wall 22 and is positioned compressibly between the spout shoulder 25 and valving member 21, its uncompressed length being greater than the distance between the spout shoulder 25 and the valving member 21. Said mount 30 includes a lower flange-like radially enlarged compressible body portion 31 having an upper flexible sealing surface 32 for bearing against the inner cup surface 13 and a lower annular valve-seating face 33 against which said lower valving member 21 bears sealedly when seated in closed position. Said mount 30 further includes an upper spring portion 34 having a tube-like body 35, a load-supporting face 36 at its upper end bearing against said spout shoulder 25 and supporting same, an external ring-like abutment 37 projecting radially outward from the tube-like body 35 at its lower end, said abutment 37 bearing against the outer cup surface 12, an upper constricted bore area 38 which sealedly and slidably grasps the spout wall 22, and a lower bore constricted area 39, also grasping the spout wall 22 sealedly and slidably. The lower bore area 39 is a cylindrical band of greater depth than the flanged circular opening 11, and forms a tight constricted seal between the flanged opening 11 and the spout wall 22. The tube-like body is provided on its inner surface, intermediate said upper constricted area 38 and said lower constricted area 39 with a thinned portion which is preferably an annular barrel-shaped concavity 40 in the bore of said tube-like body 35. The inner surface of the mount 30 (or at minimum its tube-like inner surface including the upper and lower constricted areas 38, 39) is treated with some lubricant, as a silicone in solution or suspension, to facilitate assembly and permit sliding of the spout wall 22 within the lower constricted area 39.

The valve is assembled preferably by inserting the upper end of the valving spout 20 into the opening in the lower end of the tubular valve mount 30 and forcing the valve spout 20 upwards until the mount 30 is compressed between the spout shoulder 25 and the valving member 21. The upper end of the valving spout is then inserted upward through the cup opening 11 and is forced upward until the mount sealing surface 32 bears against the inner cup surface 13 and the lower mount body portion 31 is compressed between said inner cup surface 13 and the valving member 21, thus permitting the abutment 37 to pass completely through the cup opening 11 until it is upwardly adjacent the outer cup surface 12. The valve assembly is then ready to be mounted to a pressure dispenser.

In normal, or closed, position the elastic resistance of the valve mount 30 to its compression between the spout shoulder 25 and the valving member 21, as well as the pressure of the gas within the container, holds said valving member 21 sealedly against the valve seating face 33. The sealing surface 32 bearing against the inner cup surface 13 prevents leakage of gas pressure or the contents of the container around the outside of the valve mount 30. The enlarged body portion 31 and abutment 37 grasp the mounting cup 10 around the cup opening 11, thereby mounting the valve spout movably within the cup opening 11.

When a downward force is applied to the valve spout 20 the upper spring portion 34 elastically resists such force by bowing radially outward in the vicinity of the thinned concavity 40, as shown in Figure 2. Bowing may be precipitated by a mere weakening of the tube wall and, in the valve assembly illustrated in Figures 1 and 2, such bowing would be outward since inward bowing is prevented by the spout wall 22. However, superior results are obtained by precipitating outward bowing by means of a thinned, barrel-shaped concavity such as 40. Such bowing permits downward displacement of the valve spout 20 sufficient for quick gassing, its cylindrical wall 22 sliding within the lubricated lower constricted area 39, unseating the valving member 21 so as to permit the introduction of gas under pressure through the spout opening 24 and into the dispenser through the port 23. In this open position, the upper and lower constricted bore areas 38 and 39 sealedly grasp the cylindrical wall 22 of the spout 20 preventing leakage of gas pressure or contents of the dispenser between the spout 20 and the mount 30. When the downward force on the spout 20 is released, the bowed spring portion 34 returns to its normal position, seating the valving member 21 sealedly against the valve-seating face 33 with a springing movement, thus preventing any escaping of the gas or contents of the dispenser.

Unusually great downward pressure, such as may be exerted by an automatic gassing machine, will not result in the abutment 37 being forced through the cup opening 11. Rather, the bowing of the tube wall tends to distend said abutment outwardly, increasing its outer diameter so that it is thereby held in position more securely. The greater the downward force, the greater is the bowing and consequently the greater is the secureness of said abutment.

When used for dispensing, the dispenser may be inverted and a sideward force applied to the spout 20 near its top. The tube wall of the spring portion 34 will tend to bow radially outward on the side in the direction in which said force is applied, permitting the spout 20 to tilt and unseat the valving member 21 on one side. When the sideward force on the spout 20 is released, the bowed spring portion 34 returns to its normal position, snapping the unseated side of the valving member 21 sealedly against the valve-seating face 33, and thus preventing any further discharge of the dispenser contents.

The alternative valve assembly shown in Figure 3 is of the popular "push-down" type. It comprises a mounting cup generally designated 10', a substantially rigid tubular valving spout generally designated 20', a tubular valve mount generally designated 30' formed of elastic rubber-like material, a dip-tube mounting nipple 41, a dip-tube 42, a retention ring 46 and an actuator 43 which includes a nozzle opening 47.

The mounting cup 10', valving spout 20' and valve mount 30' each respectively have parts corresponding to those identified in the embodiment shown in Figures 1 and 2 and are correspondingly numbered. In addition, said mount 30' includes a nipple-receiving groove 44 bounded on its inner side by the lower mount body portion 31' and on its outer side by an integral skirt 45 depending from the lower mount body portion 31'.

After the cup 10', the spout 20' and the mount 30' are assembled in the same manner as the corresponding parts in the valve assembly illustrated in Figures 1 and 2, the nipple 41 is inserted into the groove 44, with the nipple wall encompassed by the skirt 45 which is effectively locked to it by a retention ring 46. The dip-tube 42 is then mounted onto the lower end of the nipple 41. The valve assembly is then ready to be mounted to a dispenser. The actuator 43 may be press-fitted onto the spout 20', preferably after gassing the dispenser, although it is designed to permit gassing through its nozzle opening 47. The actuator 43 has an outer skirt-like depending wall 48 terminating in a lower margin 49. If gas is inserted after the actuator 43 is press-fitted on the spout 20', its lower margin 49 will bear against the outer cup surface 12 to limit the amount the actuator 43 may be depressed. It bears similarly when pushed down to discharge the container contents. Except as noted, this embodiment functions in the same manner as the embodiment shown in Figure 2 during gassing. However, unlike the embodiment illustrated in Figures 1 and 2, this alternative embodiment permits dispensing by either exerting a tilting or downward pressure on the actuator 43 while the dispenser is held in an upright position. The bowing of the tube wall of the spring portion 34', as described in connection with the embodiment shown in Figure 2, permits downward displacement of the spout 20' to a greater extent and with greater ease than has previously been possible in valves relying merely on the compressibility of rubber-like material to permit downward displacement. Also, since the outward bowing of such tube wall not only permits greater displacement, but also increases the security of engagement of the abutment 37' with the outer cup surface 12', it is unnecessary to construct the end of the spout 20' and actuator 43 to precise dimensional tolerances.

The present invention may be employed upon and in connection with other types of dispensers and other types of dispensing valves. In the claim which follows, it has been necessary to select certain language to describe spatial and directional relationships which could be readily varied. Such discharge valves are usually in the top wall of a dispenser, with the tubular valve mount 30 in a horizontal plane, and with the valving spout 20 vertical when in closed position. It is convenient to think of a central axis about which the tubular valve mount 30, 30' may be considered to be formed. Thus, in the claim the term "downward," or sometimes "inner," refers to a direction taken along such axis from without the container inward through the mounting cup opening 11, 11', whereas "radially outward" means perpendicular to such axis. The other terms of direction used in the claims will be understood as relating to these which have been defined. However, the claim covers the same structural relationships even though valves may be installed sidewards or slantingly, or in some container wall other than the top wall.

The constructions here shown have proved to be practical and reliable. Variations will suggest themselves to those skilled in the art; accordingly, this invention is not to be construed narrowly, but rather fully coextensive with the claim.

We claim:

A dispenser having a valve adapted for gassing by downward displacement of said value, comprising a circularly-apertured top wall, a rigid valving spout passing through the apertured top wall and having a valve head and a tubular stem including a cylindrical wall portion ported inwardly of the level at which it passes through the top wall and imperforate at the level at which it passes through said wall, the stem having a shoulder outwardly of said level, together with a resilient tubular valve mount including an upper end portion grasping the stem beneath and abutting its shoulder, a seat portion inwardly of the top wall, a hollow cylindrical bore portion at the level of the top wall and constricted between the edges of the top wall aperture and the imperforate wall stem portion whereby to form a tight seal therebetween, an annular enlargement outwardly adjacent to said level and overhanging the edge of the wall aperture, further including a tube portion outwardly adjacent thereto having a concavity on its inner surface thinning its wall to a thickness less than that of the cylindrical bore portion at the level of the top wall, whereby on depressing the stem inward, the concavely thinned wall portion bows outward to bind the valve mount more securely within the top wall aperture.

References Cited in the file of this patent

UNITED STATES PATENTS

| | | |
|---|---|---|
| 2,704,172 | Lapin | Mar. 15, 1955 |
| 2,744,665 | Carlson et al. | May 8, 1956 |
| 2,772,035 | Collins et al. | Nov. 27, 1956 |

FOREIGN PATENTS

| | | |
|---|---|---|
| 771,141 | Great Britain | Mar. 27, 1957 |